US006952217B1

(12) United States Patent
Diard et al.

(10) Patent No.: US 6,952,217 B1
(45) Date of Patent: Oct. 4, 2005

(54) GRAPHICS PROCESSING UNIT SELF-PROGRAMMING

(75) Inventors: Franck R. Diard, Mountain View, CA (US); Christopher W. Johnson, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 10/627,376

(22) Filed: Jul. 24, 2003

(51) Int. Cl.⁷ .............................................. G09G 5/37
(52) U.S. Cl. ..................................... 345/562; 345/559
(58) Field of Search ............................... 345/501–503, 345/561–563, 559, 530, 564, 568

(56) References Cited

U.S. PATENT DOCUMENTS

| 5,861,893 | A | * | 1/1999 | Sturgess | 345/562 |
| 5,903,281 | A | * | 5/1999 | Chen et al. | 345/504 |
| 5,929,872 | A | * | 7/1999 | Greene | 345/561 |
| 6,141,020 | A | * | 10/2000 | Larson | 345/562 |
| 6,630,936 | B1 | * | 10/2003 | Langendorf | 345/562 |
| 6,784,893 | B2 | * | 8/2004 | Marino | 345/561 |

* cited by examiner

Primary Examiner—Kee M. Tung
(74) Attorney, Agent, or Firm—Townsend and Townsend and Crew LLP (57) ABSTRACT

A method of self-programming a graphics processing unit (GPU) includes receiving a blit instruction defining a blit operation and storing a first control value in a control register, which determines the behavior of the GPU, using the blit operation. The blit instruction is read by the GPU from a command buffer asynchronously with the CPU. The blit operation is applied to a second control value to determine the first control value. The second control value can be stored in a memory, such as a second control register or a table of control values accessed by an index value. In one application, the second control value is a starting memory address for a display buffer, while in another application, second control value is a clip plane distance. The blit operation can include a copy operation, a colorkey operation, a logic operation, and/or a pattern copy operation on the first control value.

41 Claims, 7 Drawing Sheets

RPC == 0, BOUNDING BOX NOT VISIBLE

| | BB | BLT RPC TO TMP | BLT TMP TO NCP | RESULT |
|---|---|---|---|---|
| RPC | 0 | 0 | 0 | |
| TMP | 10000 | 10000 | 10000 | NCP = 10000, so Object 2 is not rendered |
| NCP | 1 | 1 | 10000 | |

↖ 710

RPC != 0, BOUNDING BOX VISIBLE

| | BB | BLT RPC TO TMP | BLT TMP TO NCP | RESULT |
|---|---|---|---|---|
| RPC | 2 | 2 | 2 | |
| TMP | 10000 | 55535 | 55535 | NCP = 1, so Object 2 is rendered |
| NCP | 1 | 1 | 1 | |

GRAPHICS PROCESSING UNIT SELF-PROGRAMMING

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering instructions and data defining the desired rendered image or images. For example, rendering instructions and data can define scene geometry, lighting, shading, texturing, motion, and/or camera parameters for a scene. The graphics processing subsystem creates one or more rendered images from the set of rendering instructions and data.

To maximize rendering performance, it is generally desirable for the CPU and the graphics processing subsystem to operate asynchronously. This permits both the CPU and the graphics processing subsystem to operate independently of each other and without interruption. However, typical graphics processing subsystems require the direct assistance of the CPU to perform certain tasks, such as updating the graphics processing subsystem's control registers or evaluating conditional statements. During these tasks, the CPU and graphics processing subsystem must operate synchronously. Typically, this requires the graphics processing subsystem to be idle while waiting for the CPU, or vice-versa. This wasteful processing overhead decreases the performance of the computer system. Further, many rendering optimizations that are theoretically possible cannot be implemented because the processing overhead is greater than the performance improvements.

It is therefore desirable for a graphics processing subsystem to perform tasks such as updating its own control registers or evaluating conditional statements without the assistance of the CPU.

BRIEF SUMMARY OF THE INVENTION

An embodiment of the invention leverages the blit engine of the graphics processing unit to load and/or combine values in its control registers, enabling the GPU to program itself asynchronously and without assistance from the CPU. Embodiments of the invention can be used for simple programming tasks such as loading a new value into a control register, or for more complicated tasks such as conditional rendering.

One embodiment of the invention is a method of self-programming a graphics processing unit (GPU) including receiving from the CPU a blit instruction defining a blit operation and storing a first control value in a control register using the blit operation. The first control value in the control register determines the behavior of the GPU. In a further embodiment, the blit instruction is read by the GPU from a command buffer asynchronously with the CPU.

In another embodiment, the blit operation is applied to a second control value to determine the first control value. The second control value can be stored in a memory. In one embodiment, the memory is a second control register. In yet another embodiment, the memory includes a table of control values, including the second control value, accessed by an index value. In yet a further embodiment, the index value is changed to access a third control value in the table following the blit operation.

In still a further embodiment, the second control value is a starting memory address for a display buffer. In an alternate embodiment, the second control value is a clip plane distance. In one example of this alternate embodiment, the second control value is greater than the depth extent of an object.

In yet another embodiment of the invention, the blit operation includes a colorkey operation. In an additional embodiment, the blit operation includes a logic operation on the first control value. In still another embodiment, the blit operation includes a pattern copy operation. In a further embodiment, the first control value is a copy of the second control value.

BRIEF DESCRIPTION OF THE DRAWINGS

The invention will be described with reference to the drawings, in which.

DETAILED DESCRIPTION OF THE INVENTION

The present invention is generally a method and system for programming the control registers of the graphics processing subsystem and evaluating conditional statements without the assistance of the CPU. This eliminates the wasteful processing overhead associated with the synchronous operations typically used to perform these tasks.

Figure 1:
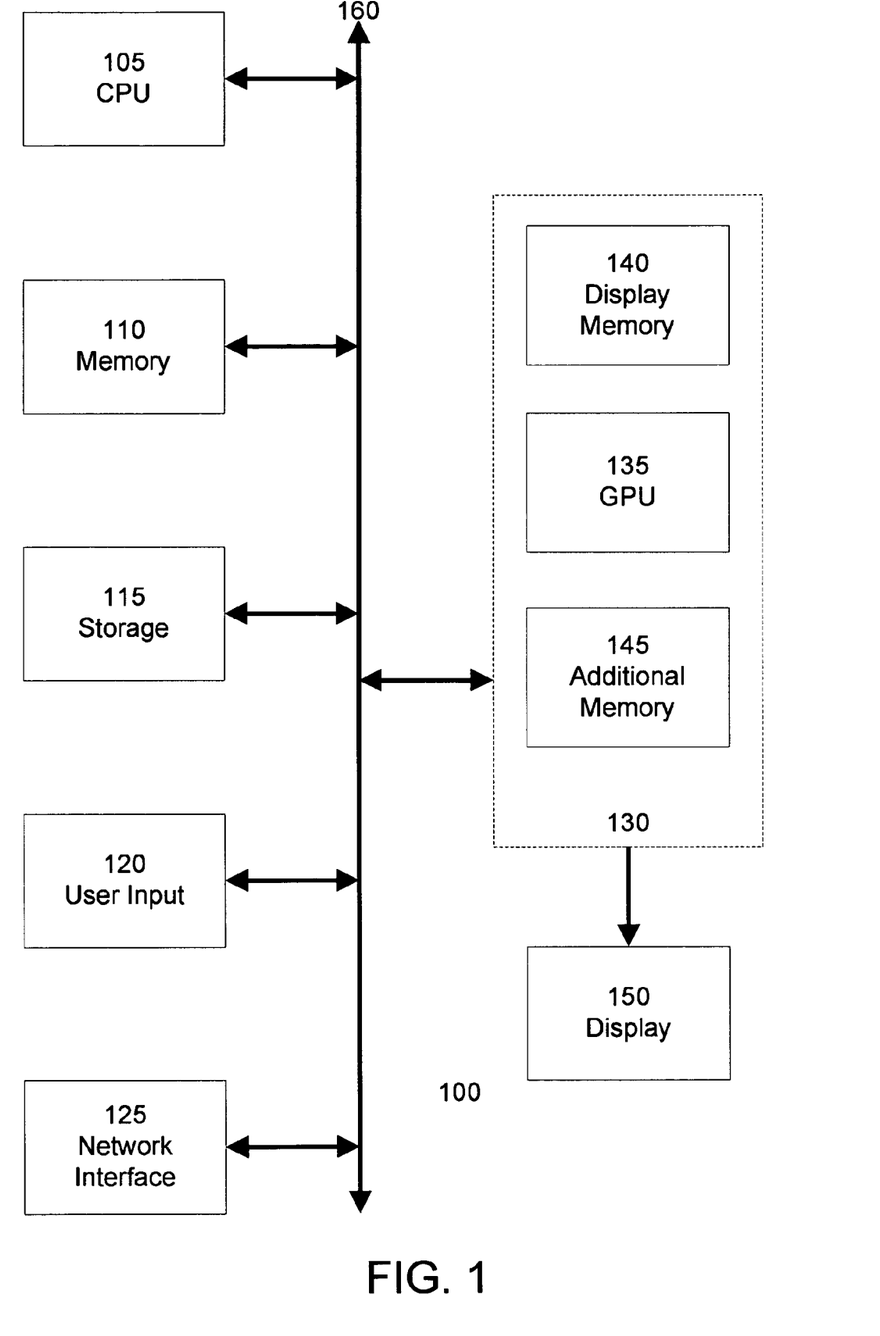
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or instructions defining the desired output images, from which the GPU 135 generates the pixel data of one or more output images. The data and/or instructions defining the desired output images is stored in additional memory 145. In an embodiment, the GPU 135 generates pixel data for output images from instructions and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

Figure 2A:
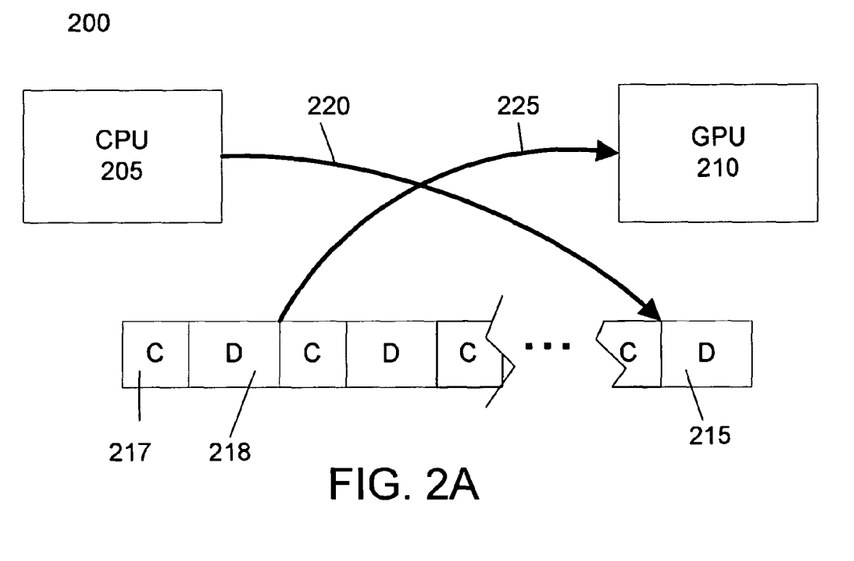
FIGS. 2A and 2B illustrate the communications between a central processing unit (CPU) and a graphics processing unit (GPU) according to an embodiment of the invention.
Figure 2B:
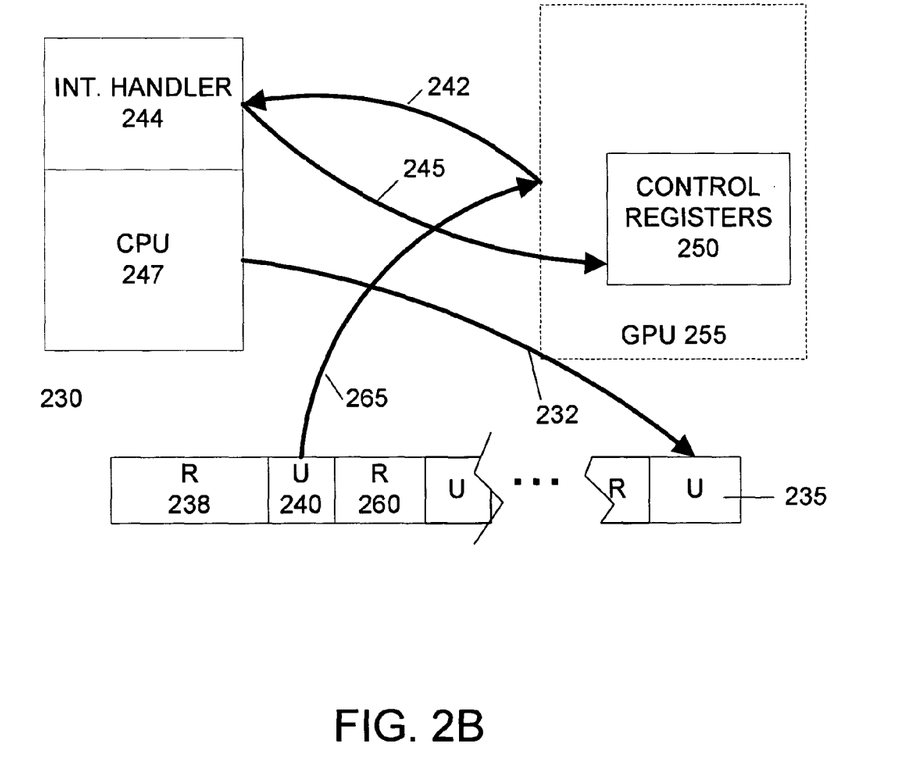

FIGS. 2A and 2B illustrate the communications between a central processing unit (CPU) and a graphics processing unit (GPU) according to an embodiment of the invention. FIG. 2A is a block diagram 200 illustrating asynchronous communication between the CPU 205 and the GPU 210. In this embodiment, the CPU 205 and the GPU 210 communicate asynchronously through a command buffer 215. Command buffer 215 is stored in memory accessible to both the CPU 205 and the GPU 210. In an embodiment, the command buffer 215 is stored in the computer system's general memory, such as memory 110 discussed in FIG. 1, and is accessible to the GPU 215 via direct memory access (DMA) transfers.

Command buffer 215 stores a set of rendering commands, such as command set 217, and rendering data, such as data set 218. In one embodiment, a command set is associated with a data set. The command set defines the set of rendering processes to be performed by the GPU on the data set. In a further embodiment, the associated data set is stored in the command buffer 215 immediately after its associated command set.

The CPU 205 writes command and data sets to the command buffer 215. The command buffer 215 can include a number of command and data sets. The CPU 205 writes command and data sets into the command buffer 215 at the location determined by "put" pointer 220. Following each CPU write into the command buffer 215, the CPU 205 increments the put pointer 220 to the next unused location in the command buffer 215. In an embodiment, a driver software program executed by the CPU 205 translates high-level rendering instructions from a rendering application into command and data sets, which are then written into the command buffer 215. In a further embodiment, the driver software program receives high-level rendering instructions via an application programming interface, for example DirectX™ or OpenGL™.

The GPU 210 reads command and data sets from the command buffer 215. The GPU 210 reads command and data sets from the command buffer 215 at the location determined by "get" pointer 225. Following each GPU read from the command buffer 215, the GPU 210 increments the get pointer 225 to the location of the next command or data set in the command buffer 215.

The CPU 205 and GPU 210 can access the command buffer independently. This enables the CPU 205 and GPU 210 to operate asynchronously. In an embodiment, the CPU 205 periodically adds new command and data sets to the command buffer. Simultaneously, the GPU 210 processes command and data sets previously stored by the CPU 205 continuously. Provided the CPU 205 stays sufficiently far ahead of the GPU 210, the GPU 210 is able to render images without any idle time waiting for the CPU 205. In an embodiment, the CPU 205 writes commands and data sets for frames several frames ahead of the frame being rendered by the GPU 210.

In an embodiment, the command buffer is limited in size. As an example, a typical command buffer is five megabytes in size. When either the get pointer 225 or put pointer 220 reaches the end of the command buffer 215, the pointer is reset to the location of the beginning of the command buffer 215. In this manner, the command buffer 215 "wraps around," enabling the CPU and GPU to access the command buffer 215 in a continuous loop.

FIG. 2B is a block diagram 230 illustrating synchronous communication between the CPU 247 and the GPU 255. As discussed in FIG. 2A, the command buffer 235 contains rendering commands and data. For clarity in FIG. 2B, the pairs of associated command and data sets are shown combined together as rendering sets, such as rendering sets 238 and 260.

In FIG. 2B, the command buffer 235 includes an update command 240. The update command is adapted to instruct the GPU 255 to change the values of its control registers 250. As discussed above, the GPU 255 typically needs the CPU 247 to assist with tasks such as updating the control registers 250 of the GPU 255.

Upon retrieving update command 240 via get pointer 265, the GPU initiates an processor interrupt 242. In response to the processor interrupt 242, the CPU 247 halts its current action, for example, writing rendering sets to the command buffer 235 via put pointer 232, and executes interrupt handler 244. In an embodiment, interrupt handler is part of a software driver program adapted to interface software applications with the GPU 255. Interrupt handler 244 writes the appropriate values to the control registers 250 of the GPU 255. In an embodiment, the CPU 247 accesses the control registers 250 via a memory-mapped I/O interface.

Once the interrupt handler 244 has completed the update of the control registers 250, the GPU 255 reads and processes rendering set 260 and any successive rendering sets in the command buffer 235. Further, interrupt handler 244 allows the CPU 247 to return to its previously interrupted action.

During the execution of the update command 240, the GPU 255 sits idle and waits for the interrupt handler 244 to complete the update of the control registers 250. As discussed above, the idle period decreases the performance of the GPU 255 and makes certain optimizations impractical to implement.

Figure 3:
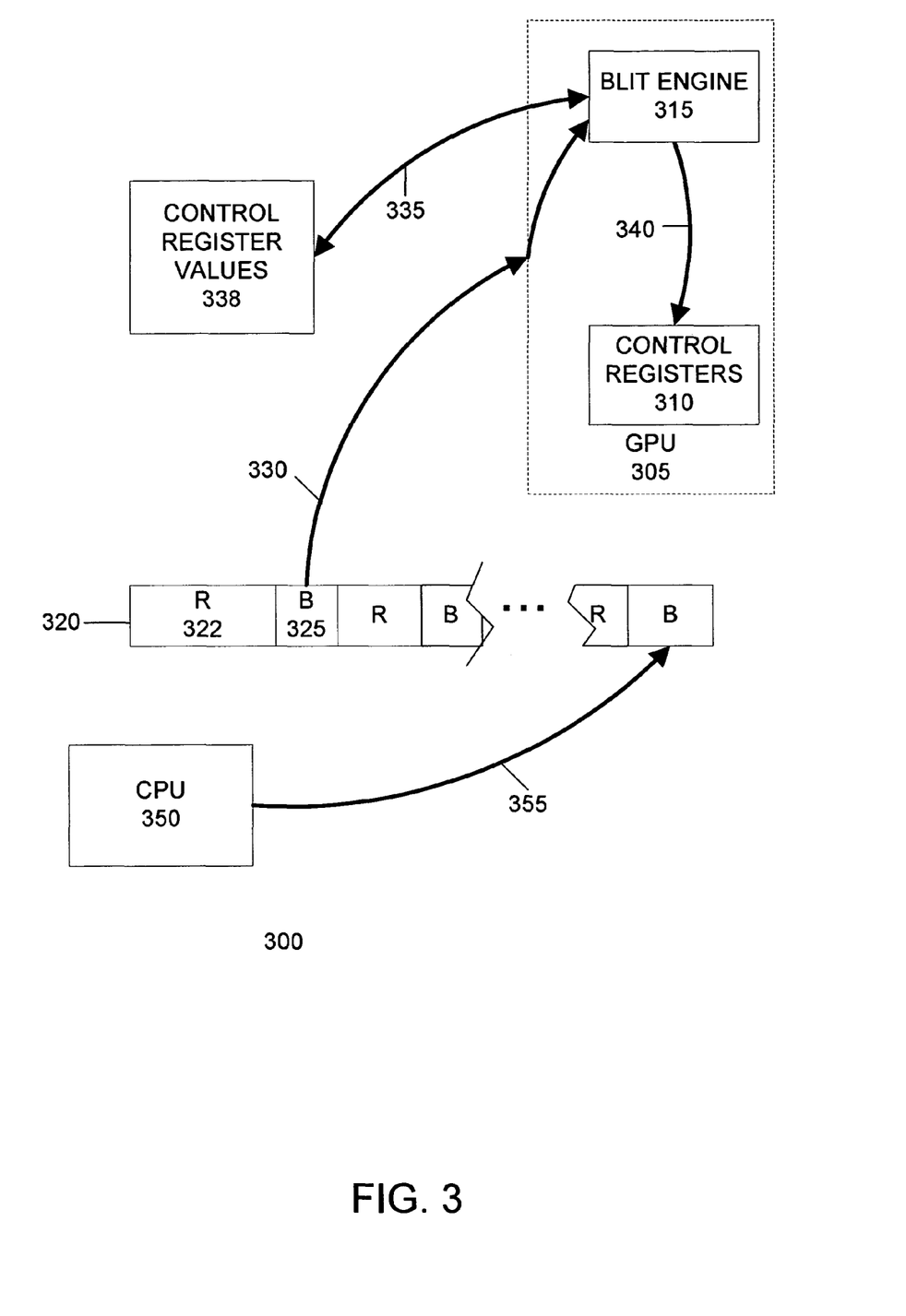
FIG. 3 is a block diagram of a self-programming GPU according to an embodiment of the invention.

To address the problems introduced by the use of synchronous communications to update, or program, the control registers of a GPU, an embodiment of the invention leverages existing GPU hardware to enable the GPU to program itself asynchronously and without assistance from the CPU. FIG. 3 is a block diagram 300 of a self-programming GPU 305 according to an embodiment of the invention. GPU 305 includes control registers 310. The values stored in the control registers 310 determine the behavior of the GPU 305.

GPU 305 also includes blit engine 315. The blit engine 315 is designed to move or copy large amounts of contiguous data from one region of memory to another region of memory. In many graphics processing subsystems, the data in display memory corresponds with the screen display. Generally, the blit engine 315 is used to move a set of data representing an object from one area of display memory to another area of display memory, thereby moving the object on the screen display. In a further embodiment, the blit engine 315 is able to perform logic operations, for example AND, OR, XOR, and NOT operations, and masking operations on the set of data as it is being moved or copied. These operations enable the moving object to be wholly or partially covered by the background image, or vice-versa. Typical example uses of the blit engine 315 include moving and/or covering windows on the screen display and moving the mouse pointer on the screen display.

Similar to the examples discussed above, GPU 320 reads rendering sets, such as rendering set 322, from command buffer 320 via get pointer 320. Unlike the above example, GPU 320 updates its control registers using the blit engine 315. Upon retrieving a blit command 325 from the command buffer 320 via the get pointer 330, the GPU activates the blit engine 315. The blit engine 315 initiates a blit operation 335 transferring one or more control register values 338 previously stored in memory to one or more control registers. The blit engine 315 reads control register values 338 from memory, or alternately from one or more control registers. The blit engine 315 then writes 340 the control register values 338 into the control registers 310, overwriting the previous values of the control registers 310. In a further embodiment, the blit engine 315 can perform one or more logic or masking operations on the control register values 338 prior to writing into the control registers 310.

Following completion of the blit operation, the GPU 305 continues operation and retrieves the next command from the command buffer 320. The GPU 305 can use the blit engine 315 to update its control registers 310 quickly and without waiting for any assistance from the CPU 350. Similarly, the CPU operates uninterrupted during the blit operation. Typically, the CPU 350 writes rendering sets and blit commands into the command buffer 320 far ahead of the get pointer 330 of the GPU 305, so that the GPU 305 can operate continuously. In an embodiment, a driver software program executed by the CPU 350 creates the rendering sets and blit commands and stores them in the command buffer 320. In a further embodiment, the driver software program creates rendering sets and blit commands in response to high-level rendering instructions received from a rendering application via an application programming interface, for example DirectX™ or OpenGL™.

The block diagram 300 shows the operation of the self-programming GPU 305 generally. Each blit command includes numerous parameters defining the specific details of the desired blit operation, such as the source and destination locations and any optionally logic or masking operations. Depending upon the update requirements, the GPU 305 can update the values of one or more of its control registers at a time. As illustrated in the example below, the GPU 305 can also perform several consecutive blit operations to store the desired control register values in its control registers. The operation of the self-programming GPU 305 will be explained in more detail in the following examples.

Double-buffered rendering is typically used to ensure that animation is flicker-free. The graphics processing subsystem renders a new image into a first display buffer. As the new image is being rendered, the graphics processing subsystem displays a previously rendered image in a second buffer. Upon completion of rendering of the new image in the first buffer, the buffers are "swapped," and the image in the first buffer is displayed and the next image is rendered into the second buffer, overwriting the previously rendered and displayed image. In a variation of this technique, a first buffer is used for rendering a new image, a second buffer is used to display a previously rendered image, and a third buffer holds a previously rendered image "on deck" to be displayed at the next screen refresh interval.

For double buffering rendering techniques, the digital to analog converter (DAC) or other display circuitry of the graphics processing subsystem must be set up to display an image from a buffer at the appropriate time. Typically, the DAC is programmed with the starting memory address of the display buffer, the pixel depth, and the width and height of the display buffer. The value of these parameters are typically stored in control registers. During buffer swapping, the value of the starting memory address is changed from the memory address of the first buffer to that of the second buffer, or vice-versa.

Previously, changing the value of the display buffer starting memory address required the assistance of the CPU, for example using an interrupt handler as discussed above. In one application of the present invention, a self-programming GPU can perform a fast buffer swapping operation with CPU assistance.

Figure 4:
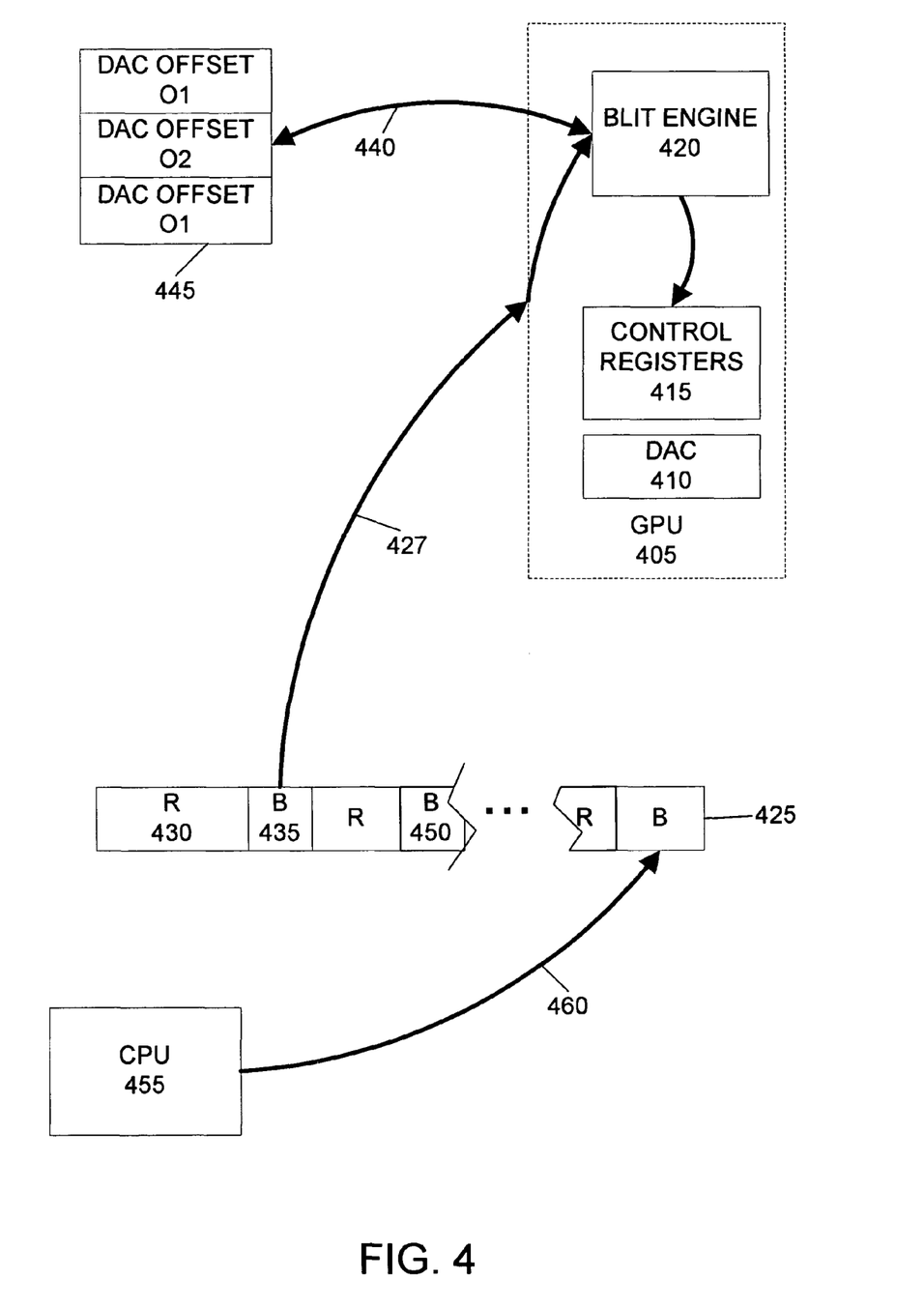
FIG. 4 is a block diagram illustrating fast buffer swapping operations for double-buffered rendering using a self-programming GPU according to an embodiment of the invention.

FIG. 4 is a block diagram 400 illustrating fast buffer swapping operations for double-buffered rendering using a self-programming GPU 405 according to an embodiment of the invention. GPU 405 includes a DAC 410 or other display circuitry for converting pixel values stored in a display buffer into a digital or analog display signal adapted for a display device. The DAC 410 is programmed with a number of parameters, including a display buffer starting memory address value stored in a control register 415.

The GPU 405 retrieves commands from the command buffer 425 via the get pointer 427. One or more rendering sets 430 define the desired output image created in a first display buffer. A blit command 435 for performing a buffer swap operation follows the rendering sets 430. The goal of this buffer swap operation is to change the display buffer starting memory address used by the DAC 410 to the starting memory address of the first display buffer, thereby displaying the output image on the display device.

Upon completion of the output image in the first display buffer, the GPU 405 retrieves and executes the blit command 435. In response to blit command 435, blit engine 420 initiates a blit operation 440. Blit operation 440 retrieves a new DAC offset value from a table of DAC offset values 445 previously stored in memory. Each DAC offset value in table 445 is the starting memory address of a display buffer. In an embodiment using two display buffers, the table 445 includes at least one copy of a DAC offset value for each of the two display buffers.

Blit operation 440 retrieves the new DAC offset value from table 445 and stores this value in the appropriate one of the control registers 415, overwriting the previously stored value. The new DAC offset value retrieved from the table 445 corresponds to the starting memory address of the first display buffer. The DAC 410 or other display circuitry will use the new DAC offset value stored in the control registers 415 as the starting memory address of the display buffer, thereby displaying the output image in the first display buffer. Similarly, upon completion of the rendering of a second output in a second display buffer, a second blit operation 450 is used to load the starting address of the second display buffer into the control registers 415, thereby causing the DAC 410 to display the second output image on a display device.

In an embodiment, the buffer swap operation uses blit operations to load additional parameters beside the display buffer starting memory address into the control registers. In another embodiment, the CPU 455 writes commands into the command buffer via the put pointer 460 several frames ahead of the GPU 405 rendering operations. For example, the CPU 455 writes commands into the command buffer 425 approximately three frames ahead of the GPU 405. In this embodiment, the table 445 will include a total of three DAC offsets values. In an application with only two different display buffers, the first and third table values will be the same, for example the DAC offset value of the first display buffer. The second table value will be the DAC offset value of the second display buffer.

Unlike this example application of the present invention, previous buffer swapping operation required a processor interrupt for each buffer swap. In high frame rate applications, for example over 100 frames per second, the large number of interrupts creates a bottleneck on system performance. The above discussed example application of the present invention performs buffer swap operations without creating any processor interrupts. This typically improves overall rendering performance by 5 percent.

Conditional rendering is another application of the present invention. In conditional rendering, the rendering of objects or portions of a scene are skipped under certain circumstances, such as when it can be quickly determined that the object or portion of the scene is not visible. This improves rendering performance by decreasing the amount of rendering performed for a given output image.

Figure 5:
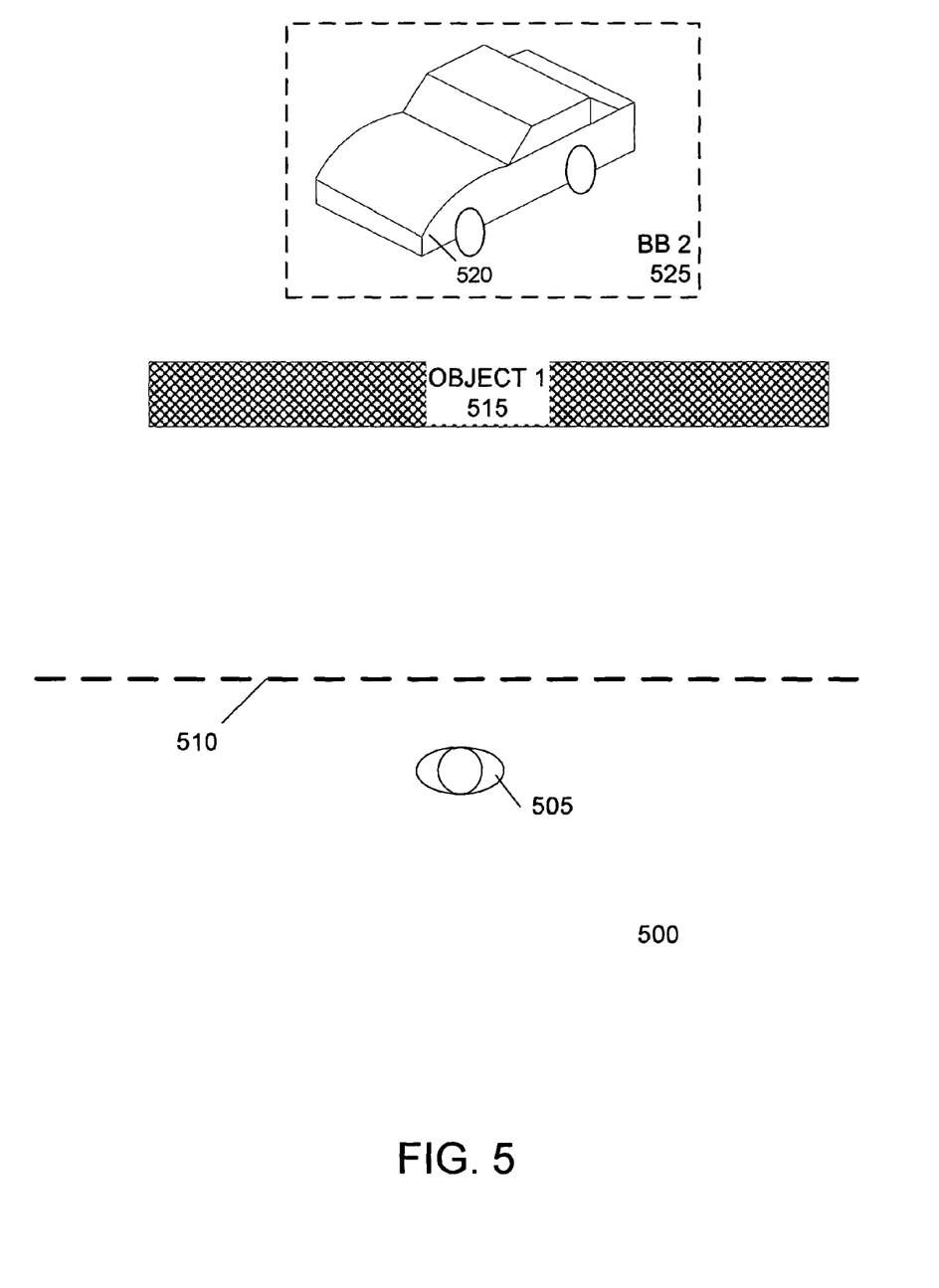
FIG. 5 illustrates an example scene that can be rendered using conditional rendering according to an embodiment of the invention.

FIG. 5 illustrates an example scene 500 that can be rendered using conditional rendering according to an embodiment of the invention. Scene 500 includes a viewpoint 505. A front clipping plane 510 defines the minimum visible distance of objects in the scene 500. Objects behind the front clipping plane 510 (i.e. objects between the front clipping plane 510 and the viewpoint 505) are not rendered. Scene 500 includes objects 515 and 520. As can be seen in FIG. 5, because object 515 completely blocks object 520, object 520 will not be visible in the final rendered image.

To avoid the wasteful rendering of object 520, a visibility test is used to determine if object 520 is completely obscured by object 515 in scene 500. If object 520 is not visible, then rendering of object 520 can be skipped. One type of visibility test uses a bounding box 525. Bounding box 525 is typically a very simple object that completely encloses the more complicated object 520. The visibility of object 520 is tested by performing a "mock" rendering of bounding box 525, If no pixels are rendered during the rendering of the bounding box 525, then it follows that object 520 is not visible in the scene and does not need to be rendered. Because bounding box 525 is much simpler than object 520, it takes much less time to render. During the rendering of the bounding box 525 rendering, no updates are made to the display buffer. This ensures that the output image is unchanged by the rendering of the bounding box 525.

Figure 6:
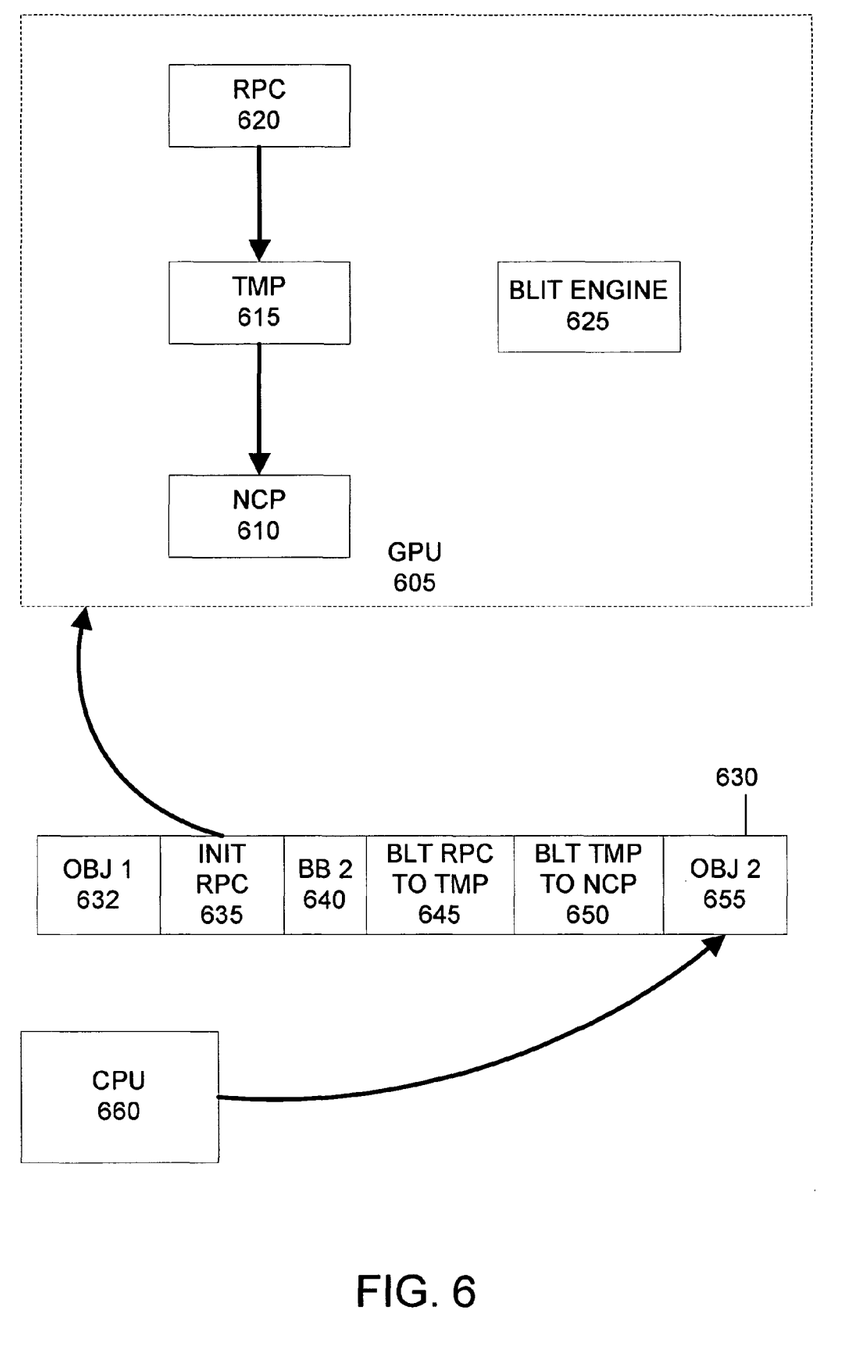
FIG. 6 illustrates a conditional rendering operation performed with a self-programming GPU according to an embodiment of the invention.

FIG. 6 illustrates a conditional rendering operation performed with a self-programming GPU 605 according to an embodiment of the invention. GPU 605 includes a near clip plane (NCP) register 610, which specifies the distance of the near clipping plane from the viewpoint. Typically, this value is 1, though as discussed below, this can be changed. GPU 605 also includes a rendered pixel count register (RPC) 620, which indicates the number of pixels rendered by the GPU 605. The RPC register 620 can be reset or initialized, so that the number of pixels rendered for different objects or portions of the scene can be easily tracked. The GPU 605 also includes at least one temporary (TMP) memory buffer 615, which can be used to store intermediate values used in rendering operations. TMP memory buffer 615 can be either a register on the GPU or a location in system memory. GPU 605 also includes a blit engine 625, which can perform blit operations between memory and registers or between two registers.

GPU 605 receives rendering sets from command buffer 630. To perform conditional rendering of the example scene 500, GPU retrieves and executes rendering sets 632 associated with object 515. Following the completion of the rendering of object 515, GPU executes initialization command 635. Initialization command 635 resets the value of the RPC register 620 to 0, and also sets the value of the TMP memory buffer 615 to a large value, such as 10000. The value of the TMP memory buffer 615 should be set larger than the depth of the object being tested for visibility, such as object 520 in this example.

The GPU 605 then renders the bounding box 525 associated with the object 520 in response to bounding box command 640. As discussed above, no updates are made to the display buffer when rendering the bounding box 525. During the rendering of bounding box 525, the RPC register 620 will be incremented if any pixels of the bounding box 525 are visible from viewpoint 505. If, upon completion of the rendering of the bounding box 525, the RPC register 620 still has a value of 0, then the bounding box 525, and hence the object 520, are not visible from viewpoint 505, and object 520 does not need to be rendered. Conversely, a non-zero value in the RPC register 620 indicates that a portion of object 520 may be visible from viewpoint 505.

The self-programming GPU 605 can be used to evaluate the value of the RPC register 620 and to skip the rendering of object 520, if necessary. In an embodiment, this evaluation is accomplished by executing two blit commands, 645 and 650. Blit command specifies blit operation of a colorkey=0 on the source value and a bitwise NOT operation of the destination 645. As explained below, this blit operation modifies the TMP memory buffer 615 based on the value of the RPC register 620.

A colorkey operation is a blit engine masking operation. A colorkey value is used to determine whether data should be processed by the blit engine or not. In a colorkey on source operation, a colorkey value is compared with the source value, and the blit operation is aborted if the values match. If the source value does not match the colorkey value, then the blit operation proceeds as indicated. In blit command 645, if the colorkey value, 0, matches the source value, which the value of the RPC register 620, then the TMP memory buffer 615 is unchanged. Conversely, blit command 645 performs a bitwise NOT operation on the value of the TMP memory buffer 615 if the colorkey value does not equal the value of the RPC register 620.

Blit operation 650 specifies a second blit operation of colorkey=55535 and a copy from the TMP memory buffer 615 to the NCP register 610. In this example, the color key value is the bitwise NOT of the initial value of the TMP memory buffer set by the initialization command 635. This value will vary depending upon the choice of the initial TMP memory buffer value and the number of bits in the TMP memory buffer (unsigned 16 bits in this example).

In blit operation 650, if the value of the TMP memory buffer 615 is equal to 55535, then nothing is copied from the TMP memory buffer 615 to the NCP register 610. In this case, the value of the NCP register 610 remains 1. Conversely, if the value of TMP memory buffer 615 is not equal to 55535, for example 10000, then the value of the TMP memory buffer 615 is copied into the NCP register 610, overwriting the previously stored value.

Following the completion of blit commands 645 and 650, GPU 605 executes rendering sets 655 associated with object 520. Although rendering sets 655 specify the rendering of object 520, the resulting value of the NCP register 610 from the previous blit commands 645 and 645 can cause the GPU 605 to skip the rendering of object 520. If the value of the NCP register 610 is 1, which is less than the depth of the object 520, then object 520 is in front of the near clipping plane 510 and will be rendered. Conversely, if the NCP register 610 has a value greater than the depth of object 520, for example 10000, the object 520 will be behind the near clipping plane 510 (i.e. the object 520 is between the viewpoint 505 and the near clipping plane 510) and object 520 will not be rendered.

It should be noted that GPU 605 reads and executes rendering sets 655 associated with object 520 regardless of the value of the NCP register 610. However, the GPU 605 will abort the processing of the rendering sets 655 and proceed to the next command in the command buffer 630 upon determining that the object is behind the near clipping plane. In an embodiment of GPU 605, the rendering pipeline is optimized to detect at an early processing stage that objects are behind the near clipping plane. This enables the GPU 605 to skip rendering object 520 without performing a large number of wasteful rendering steps.

Figure 7:
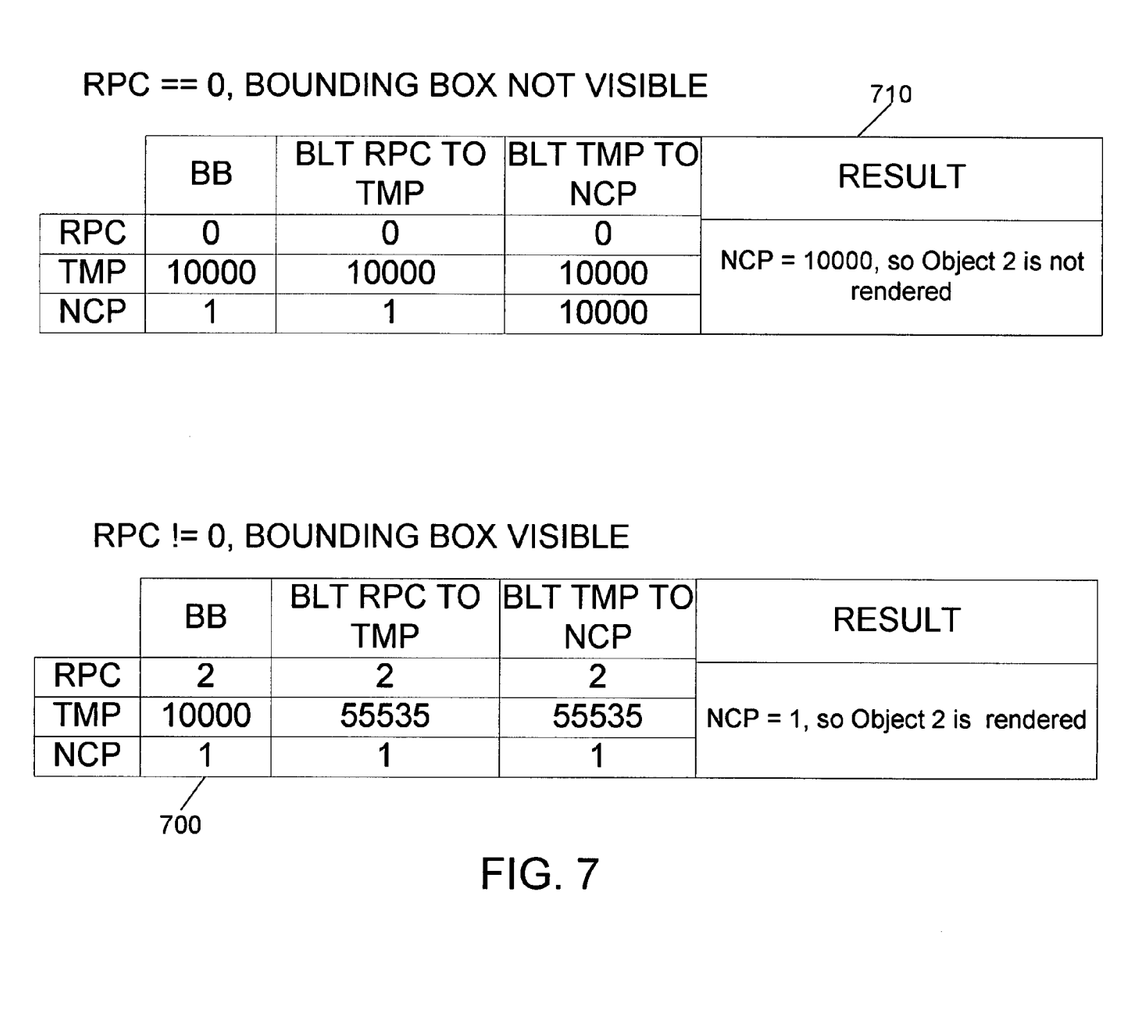
FIG. 7 shows tables illustrating example register values during a conditional rendering operation performed with a self-programming GPU according to an embodiment of the invention.

To further explain this application of the present invention, FIG. 7 shows tables 700 and 710 illustrating example register values during a conditional rendering operation performed with a self-programming GPU according to an embodiment of the invention. Tables 700 and 710 illustrates the register values of registers RPC, TMP, and NCP during the evaluation of the RPC register as described above. The table 700 is an example of the RPC register having a non-zero value, for example 2, following the rendering of the bounding box 525. The "BB" column" shows the values of the registers following the rendering of the bounding box. In this example, the RPC is 2, while the TMP value is 10000, and the NCP is still set to 1.

The first blit operation is a colorkey=0 with the RPC as the source and a bitwise NOT operation on the TMP as the destination. Because the value of the RPC register, 2, does not equal the colorkey value, the blit engine performs a bitwise NOT of the value of the TMP memory buffer. As a result, this operation sets the TMP memory buffer to 55535.

The second blit operation is a colorkey=55535 with the TMP memory buffer as the source and a copy operation to the NCP register as the destination. Because the value of the TMP memory buffer, 55535, is equal to the colorkey value, nothing is copied to the NCP register. The result is that the NCP register still has a value of 1. Therefore, the object 520 will be rendered.

The table 710 is an example of the RPC register having a zero value following the rendering of the bounding box 525, which indicates that the object 520 should not be rendered. The "BB" column" shows the values of the registers following the rendering of the bounding box. In this example, the RPC is 0, while the TMP value is 10000, and the NCP is still set to 1.

The first blit operation is a colorkey=0 with the RPC as the source and a bitwise NOT operation on the TMP as the destination. Because the value of the RPC register, 0, equals the colorkey value, the blit engine does not perform the bitwise NOT operation and the value of the TMP memory buffer is unchanged.

The second blit operation is a colorkey=55535 with the TMP memory buffer as the source and a copy operation to the NCP register as the destination. Because the value of the TMP memory buffer, 10000, does not equal to the colorkey value, the blit engine copies the value of the TMP memory buffer to the NCP register. The result is that the NCP register has a value of 10000, and the object will not be rendered.

In another example, conditional rendering can be further optimized using a pattern copy command. With a pattern copy command, the blit engine copies a pattern to a destination when the colorkey value does not match the source value. In this example, the NCP register is initialized to a large value, such as 10000, that is greater than the depth of the object being evaluated. A pattern copy command from the RPC register to the NCP register with a colorkey value of 0 and a pattern value of 1 is then performed. In this example, the pattern value is selected to be the desired near clip plane value for rendering the object. If the RPC register equals 0, matching the colorkey value, nothing is copied to the NCP register. Thus, the NCP register remains set to 10000 and the object is not rendered. Conversely, if the RPC register does not equal 0, the colorkey value is not matched and the blit engine copies the pattern value, 1, to the NCP register. Because the NCP register now equals 1, the object is rendered.

This alternate example has the advantage of only requiring a single blit operation, as opposed to the two blit operations of the previous example application. However, the pattern value, which is used to set the NCP register, must be known at the time the CPU writes the commands into the command buffer. This requires that the CPU knows the desired near clip plane distance in advance. In some situations, this is not possible and the previous example application must be used instead.

This invention provides a very efficient way to reprogram the GPU without the help of the CPU. These self programming commands, correctly interleaved with rendering sets, increase the overall performance of the graphics rendering by enabling new rendering techniques and optimizations while consuming less system resources. Although the invention has been discussed with respect to specific examples and embodiments thereof, these are merely illustrative, and not restrictive, of the invention. For instance, though the invention is discussed with reference to three example applications of a self-programming GPU, the invention is applicable to any GPU operation requiring one or more changes in control register values. Thus, the scope of the invention is to be determined solely by the claims.

What is claimed is:

1. A method of self-programming a graphics processing unit (GPU), the method comprising:
   receiving from a CPU a blit instruction defining a blit operation, wherein a destination for the blit operation corresponds to a control register; and
   storing a first control value in the control register using the blit operation, wherein the first control value in the control register determines a behavior of the GPU.

2. The method of claim 1, further comprising applying the blit operation to a second control value to determine the first control value.

3. The method of claim 2, wherein the second control value is stored in a memory.

4. The method of claim 3, wherein the memory is a second control register.

5. The method of claim 3, wherein the second control value is stored in a table of control values accessed by an index value.

6. The method of claim 5, further comprising changing the index value to access a third control value in the table following the blit operation.

7. The method of claim 2, wherein the second control value is a starting memory address for a display buffer.

8. The method of claim 2, wherein the second control value is a clip plane distance.

9. The method of claim 8, wherein the second control value is greater than the depth extent of an object.

10. The method of claim 1, wherein the blit operation includes a colorkey operation.

11. The method of claim 1, wherein the blit operation includes a logic operation on the first control value.

12. The method of claim 1, wherein the blit operation includes a pattern copy operation.

13. The method of claim 2, wherein the first control value is a copy of the second control value.

14. The method of claim 1, wherein receiving comprises reading a blit instruction from a command buffer asynchronously with the CPU.

15. A graphics rendering system comprising:
   a central processing unit;
   a graphics processing unit adapted to create graphics data in response to a graphics command, wherein the graphics processing unit has a control register and a blit engine; and
   a command buffer adapted to receive at least a first graphics command from the central processing unit and further adapted to communicate the first graphics command to the graphics processing unit;
   wherein, the blit engine is adapted to perform a blit operation that stores a first control value in the control register in response to the first graphics command.

16. The graphics rendering system of claim 15, wherein the blit engine is adapted to apply a blit operation to a second control value to determine the first control value.

17. The graphics rendering system of claim 16, further comprising a memory adapted to store the second control value.

18. The graphics rendering system of claim 17, wherein the memory is a second control register.

19. The graphics rendering system of claim 17, wherein the memory comprises a table of control values including the second control value and accessed by an index value.

20. The graphics rendering system of 16, wherein the second control value is a starting memory address for a display buffer.

21. The graphics rendering system of claim 16, wherein the second control value is a clip plane distance.

22. The graphics rendering system of claim 16, wherein the blit engine is adapted to perform a colorkey operation on the second control value.

23. The graphics rendering system of claim 15, wherein the blit engine is adapted to perform a logic operation on the first control value.

24. A method of self-programming a graphics processing unit (GPU) using a set of GPU commands created by a driver, the method comprising:
   writing a first set of rendering commands to a command buffer;
   writing a set of self-programming commands including a blit instruction to the command buffer, wherein a destination for the blit instruction corresponds to a control register of the GPU; and
   writing a second set of rendering commands to the command buffer.

25. The method of claim 24, wherein the first set of rendering commands, the set of self-programming commands, and the second set of rendering commands are written sequentially to the command buffer.

26. The method of claim 24, wherein the first set of rendering commands is associated with a first image to be rendered to a first display buffer, the second set of rendering commands is associated with a second image to be rendered to a second display buffer, and the set of self-programming commands is adapted to instruct the GPU to display the first image.

27. The method of claim 26, wherein the blit instruction is adapted to store a memory address associated with the first display buffer in a control register of the GPU.

28. The method of claim 24, wherein the first set of rendering commands is associated with a bounding box associated with an object and the second set of rendering commands is associated with the object; and further wherein the set of self-programming commands is adapted to instruct the GPU to evaluate the visibility of the bounding box and to optionally bypass the rendering of the object in response to the evaluation of the visibility of the bounding box.

29. The method of claim 28, wherein the blit instruction includes a colorkey operation on a register of the GPU.

30. The method of claim 29, wherein the register of the GPU is a rendered pixel count register.

31. The method of claim 29, wherein the blit instruction is adapted to store a control value in a control register in response to the colorkey operation, and wherein the control value is adapted to instruct the GPU to abort the processing of the second set of rendering commands.

32. The method of claim 31, wherein the control value is a clip plane distance.

33. An information storage medium having a set of instructions adapted to direct an information processing device in communication with a graphics processing unit (GPU) to perform the steps of:
   writing a first set of rendering commands to a command buffer;
   writing a set of self-programming commands including a blit instruction to the command buffer, wherein a destination of the blit instruction corresponds to a control register of the GPU; and
   writing a second set of rendering commands to the command buffer.

34. The information storage medium of claim 33, wherein the first set of rendering commands, the set of self-programming commands, and the second set of rendering commands are written sequentially to the command buffer.

35. The information storage medium of claim 33, wherein the first set of rendering commands is associated with a first image to be rendered to a first display buffer, the second set of rendering commands is associated with a second image to be rendered to a second display buffer, and the set of self-programming commands is adapted to instruct the GPU to display the first image.

36. The information storage medium of claim 35, wherein the blit instruction is adapted to store a memory address associated with the first display buffer in a control register of the GPU.

37. The information storage medium of claim 33, wherein the first set of rendering commands is associated with a bounding box associated with an object and the second set of rendering commands is associated with the object; and further wherein the set of self-programming commands is adapted to instruct the GPU to evaluate the visibility of the bounding box and to optionally bypass the rendering of the object in response to the evaluation of the visibility of the bounding box.

38. The information storage medium of claim 37, wherein the blit instruction includes a colorkey operation on a register of the GPU.

39. The information storage medium of claim 38, wherein the register of the GPU is a rendered pixel count register.

40. The information storage medium of claim 38, wherein the blit instruction is adapted to store a control value in a control register in response to the colorkey operation, and wherein the control value is adapted to instruct the GPU to abort the processing of the second set of rendering commands.

41. The information storage medium of claim 40, wherein the control value is a clip plane distance.

* * * * *